United States Patent [19]

Reiss

[11] Patent Number: 4,614,525

[45] Date of Patent: Sep. 30, 1986

[54] PRESSURE SWING PROCESS FOR THE ADSORPTIVE SEPARATION OF GASEOUS MIXTURES

[75] Inventor: Gerhard Reiss, Leverkusen, Fed. Rep. of Germany

[73] Assignee: Bayer Aktiengesellschaft, Leverkusen, Fed. Rep. of Germany

[21] Appl. No.: 718,130

[22] Filed: Apr. 1, 1985

[30] Foreign Application Priority Data

Apr. 13, 1984 [DE] Fed. Rep. of Germany ....... 3413895

[51] Int. Cl.$^4$ .......................................... B01D 53/04
[52] U.S. Cl. ........................................ 55/25; 55/58; 55/74; 165/47
[58] Field of Search .................. 55/23, 25, 26, 28, 31, 55/33, 35, 58, 62, 68, 74, 75, 189, 387, 389; 165/47, 901, 907

[56] References Cited

U.S. PATENT DOCUMENTS

| | | | |
|---|---|---|---|
| 2,340,398 | 2/1944 | MacMullin | 55/58 |
| 3,059,396 | 10/1962 | Thees | 55/189 |
| 3,085,379 | 4/1963 | Kiyonaga et al. | 55/58 X |
| 3,225,518 | 12/1965 | Skarstrom et al. | 55/58 X |
| 3,498,025 | 3/1970 | Bednarski | 55/58 X |
| 3,800,507 | 4/1974 | Howell et al. | 55/33 |
| 3,923,477 | 12/1975 | Armond et al. | 55/58 X |
| 3,989,478 | 11/1976 | Jones | 55/23 X |
| 4,144,037 | 3/1979 | Armond et al. | 55/58 |
| 4,467,785 | 8/1984 | Langford et al. | 55/33 X |
| 4,503,902 | 3/1985 | Zolik | 165/47 |
| 4,531,951 | 7/1985 | Burt et al. | 55/23 |

FOREIGN PATENT DOCUMENTS 0038410 10/1981 European Pat. Off. .
0082948 2/1983 European Pat. Off. .
0072083 2/1983 European Pat. Off. .
1817004 8/1969 Fed. Rep. of Germany .

OTHER PUBLICATIONS

K. Knoblauch, "Inertgaserzeugung aus Luft unter Einsatz von Kohlenstoffmolekularsleben . . . ", Wärme Gas International, vol. 32 (1983) pp. 78–80.
G. Kurz, "Der Calcor Prozess", Chemie-Technik (Sep. 1978).
G. Reiss, "Sauerstoffanreicherung von Luft mit Molekularsieb-Zeolithen", Technik in Betrieb, Nov. 1983, pp. 689–692.
Hanju Lee and D. E. Stahl, "Oxygen Rich Gas From Air by Pressure Swing Adsorption Process", Alche Sym Ser, vol. 69, No. 134, Aug. 1983, pp. 296–300.

Primary Examiner—Robert Spitzer
Attorney, Agent, or Firm—Sprung Horn Kramer & Woods

[57] ABSTRACT

An improved continuously operating adsorption process for the purification and separation of gaseous mixtures by pressure swing adsorption is disclosed. The improvement is achieved by heating the gaseous mixture to be separated by heat exchange with the vacuum pump which consists of at least two in series operating pumps. The present process is especially suited for efficiently producing oxygen-enriched air.

1 Claim, 3 Drawing Figures

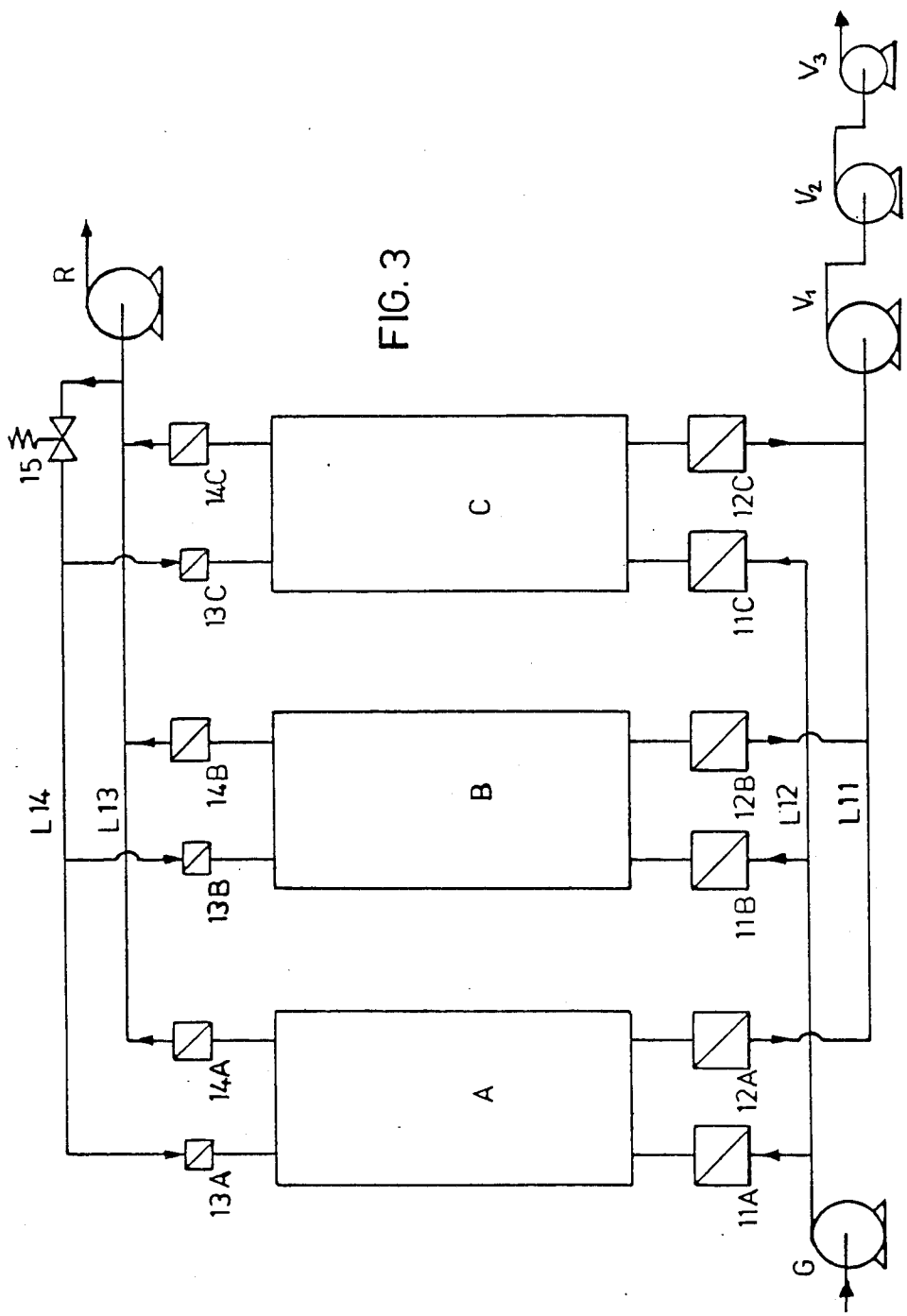

PRESSURE SWING PROCESS FOR THE ADSORPTIVE SEPARATION OF GASEOUS MIXTURES

The present invention relates to an improved pressure swing process with vacuum desorption for the continuous separation of a gaseous mixture by adsorptive methods with reduced energy consumption in the entire installation.

Processes employing pressure swing adsorption (PSA) are adopted if the component in the untreated gas which is to be removed is present in a relatively high concentration, for example above 1% by volume, or is adsorbed unsatisfactorily on the adsorbent, and large adsorption units and large quantities of regeneration gas are thus required during thermal regeneration. Adsorptive separation generally takes place at a higher pressure than the desorption of the adsorbed components which follows the adsorption stage. In most cases, desorption is assisted by flushing the adsorbent with a proportion of the product gas, for example during the recovery of hydrogen from hydrogen-rich gases or during the drying of gases. During the adsorptive separation of air into nitrogen and oxygen, this flushing is effected with the desired product gas, i.e. the non-adsorbed phase or the adsorbed phase.

Several processes for the adsorptive separation of gases are known in which desorption of the adsorbed phase is effected using a vacuum pump, for example the recovery of $O_2$-enriched air with molecular sieve zeolites (see U.S. Pat. No. 3,533,221) or the recovery of nitrogen from air with molecular sieve coke (K. Knoblauch, Wärme Gas International, Volume 32 (1983) book 2/3, page 78/80), the recovery of pure carbon monoxide for CO-rich gases with molecular sieve zeolites (Great Britain Patent No. 1,437,600), and the recovery of nitrogen from air with molecular sieve zeolites (GB-PS No. 1.461.569).

These processes invariably take place at ambient temperature, i.e.20° to 30° C., and adsorption takes place at 1 bar (abs) or excess pressure. The gas to be separated is passed through an adsorber consisting of suitable adsorbents such as active carbon, molecular sieve coke, silica gel, activated aluminum oxide, molecular sieve zeolites, the more strongly adsorbed components being separated from the less strongly adsorbable components, and the less strongly adsorbable phase leaving the adsorber. Adsorption of the individual components usually takes place in more or less pronounced zones, i.e. the most strongly adsorbed component becomes concentrated at the entrance of the adsorber and the more weakly adsorbed components in the direction of the adsorber outlet. If the gas to be separated is moist, water is adsorbed at the entrance zone on all the above-mentioned adsorbents.

In the case of reduced pressure desorption, desorption of the adsorbed phase is effected using a suitable vacuum pump, the direction of flow generally occurring in counter-current to the adsorption direction and, in some cases, a suitable flushing gas, usually a proportion of the non-adsorbed phase is used at the adsorber end (adsorption outlet) for improving desorption. The final pressure of the desorption operation is from 5 to 300 mbar and is based, among other things, on the type of vacuum pump used and the components to be desorbed. After the desorption stage, the adsorber is filled again to adsorption pressure, for which purpose the non-adsorbed phase or also the gaseous mixture to be separated is used. The adsorption period or desorption period in this process lasts from 30 to 50 seconds.

The vacuum pumps used are water ring pumps or oil ring pumps based on the displacement effect of the rotating slide.

The economic viability of these installations is influenced by the output of the vacuum pump and also by the investment costs, distribution of resources such as re-filling with adsorbents. In practice, it has proven advantageous to determine the specific output ($\overline{N}$). i.e. the energy consumption of the vacuum pump (N) based on quantity of product obtained (Vp), $\overline{N} = N/V_p = KWh/Nm^3$. In the present vacuum pump, the specific energy consumption depends on the various processing conditions such as desorbed quantity of gas, cycle time, final desorption pressure, selectivity of the adsorbent, quantity of product produced (Chem. Ind, Nov. 35, 1983 page 689–692).

Generally speaking, with a weaker reduced pressure less material can be desorbed (for example only 250 mbar instead of 150 mbar) and the production of the non-adsorbed phase is reduced. This has an adverse effect on the specific energy consumption of the adsorption installation. This disadvantage can obviously not be overcome by enlarging the vacuum pump as the energy introduced would also be increased.

Insufficient desorption occurs, for example, during the $O_2$-concentration of air with molecular sieve zeolites, if the adsorption temperature falls from, for example, 25° C. to less than 10° C., so that a larger quantity of nitrogen is adsorbed per kg of adsorbent and the final desorption pressure is impaired. The quantity of product produced is thus reduced (non-adsorbed phase) and the specific energy consumption $\overline{N}$ of the installation is increased while the size of the vacuum pump remains constant.

The present invention accordingly relates to a process for separating gaseous mixtures which overcomes these disadvantages of undesirable energy consumption by using vacuum pumps adapted to the process.

A process for reduced pressure desorption has been found in which the energy consumption of the vacuum pump relative to the quantity of product obtained is reduced in comparison to formerly adopted processes by selection and arrangement of suitable vacuum pumps.

The present invention relates to a continuously operating adsorption process for the purification and separation of gaseous mixtures by pressure swing adsorption, consisting of at least two adsorbent beds which are permeated by the gas to be separated at at least 1 bar (abs) and wherein the non-adsorbed component is removed at the adsorber outlet, desorption is effected using a vacuum pump in a counter-current to adsorption and the desorbed phase also removed as product, characterized in that the gaseous mixture to be separated is heated by heat exchange with the vacuum pump, the vacuum pump optionally also consisting of at least two individual vacuum pumps connected in series and having differing suction capacities.

BRIEF DESCRIPTION OF THE DRAWINGS

FIG. 3, is a further embodiment of the present process where several vacuum pumps are connected in series.

The process according to the invention will be illustrated by reference to the production of oxygen-enriched air using molecular sieve zeolites, (11) or flaps for the admission of crude gas and valves (12) for the discharge of the desorbed gas are located on the underside of the adsorber. The adsorbent bed consists at the lower end of a protective layer such as silica gel for the pre-drying of the entering crude gas, the main zones with adsorbent for separating the gas stream being located above it. Valves (14) for the discharge of gas which has been treated by adsorption are located at the upper end of the adsorber and the adsorbers are filled again to adsorption pressure via further valves (13). This filling operation can be controlled using valve 15 in such a way that a constant rise in the pressure or a constant quantity of filling gas is achieved. The fan (G) for the entering air bridges over the pressure drop during adsorption and the adsorption pressure is about one bar abs.

Figure 1:
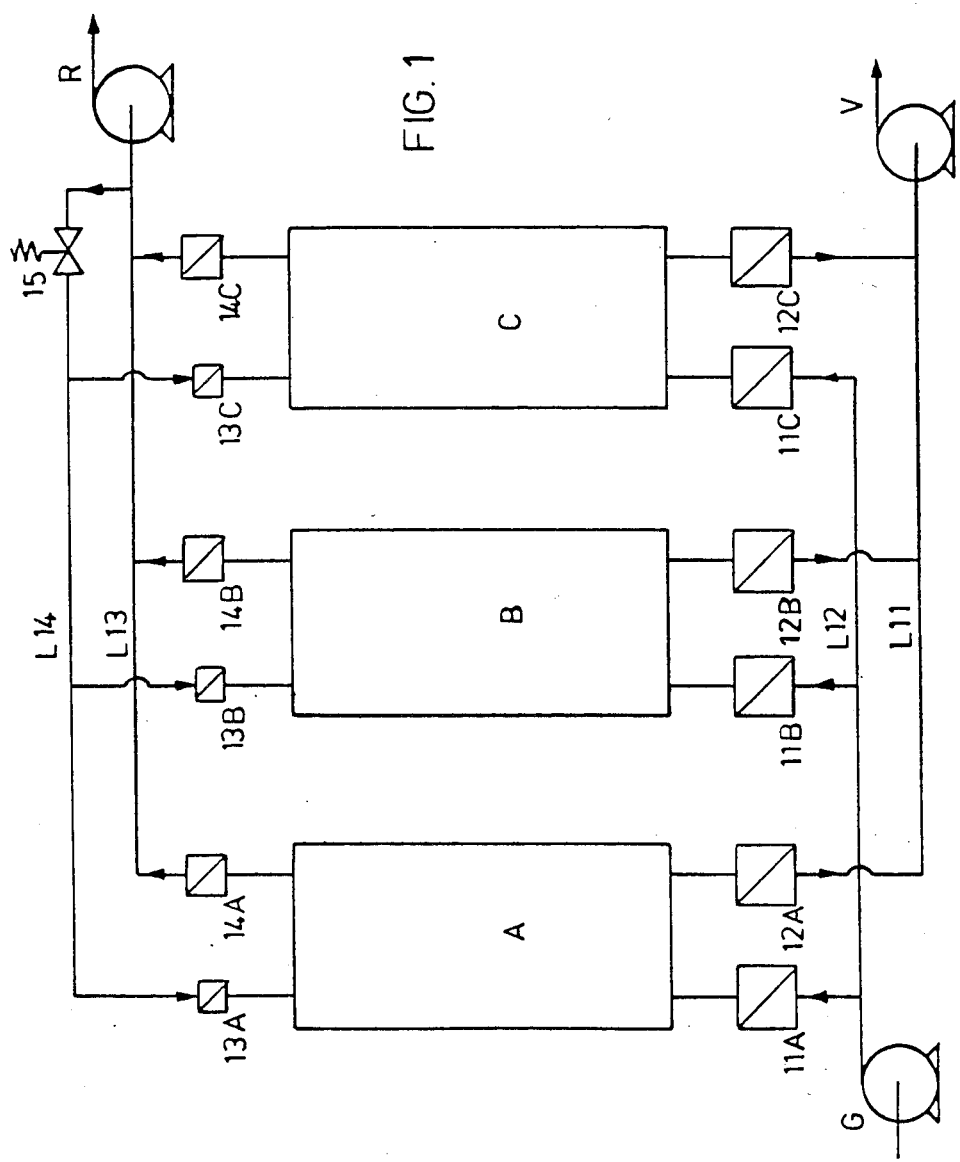
FIG. 1, shows a flow chart of part of a pressure swing adsorption process.
Figure 2:
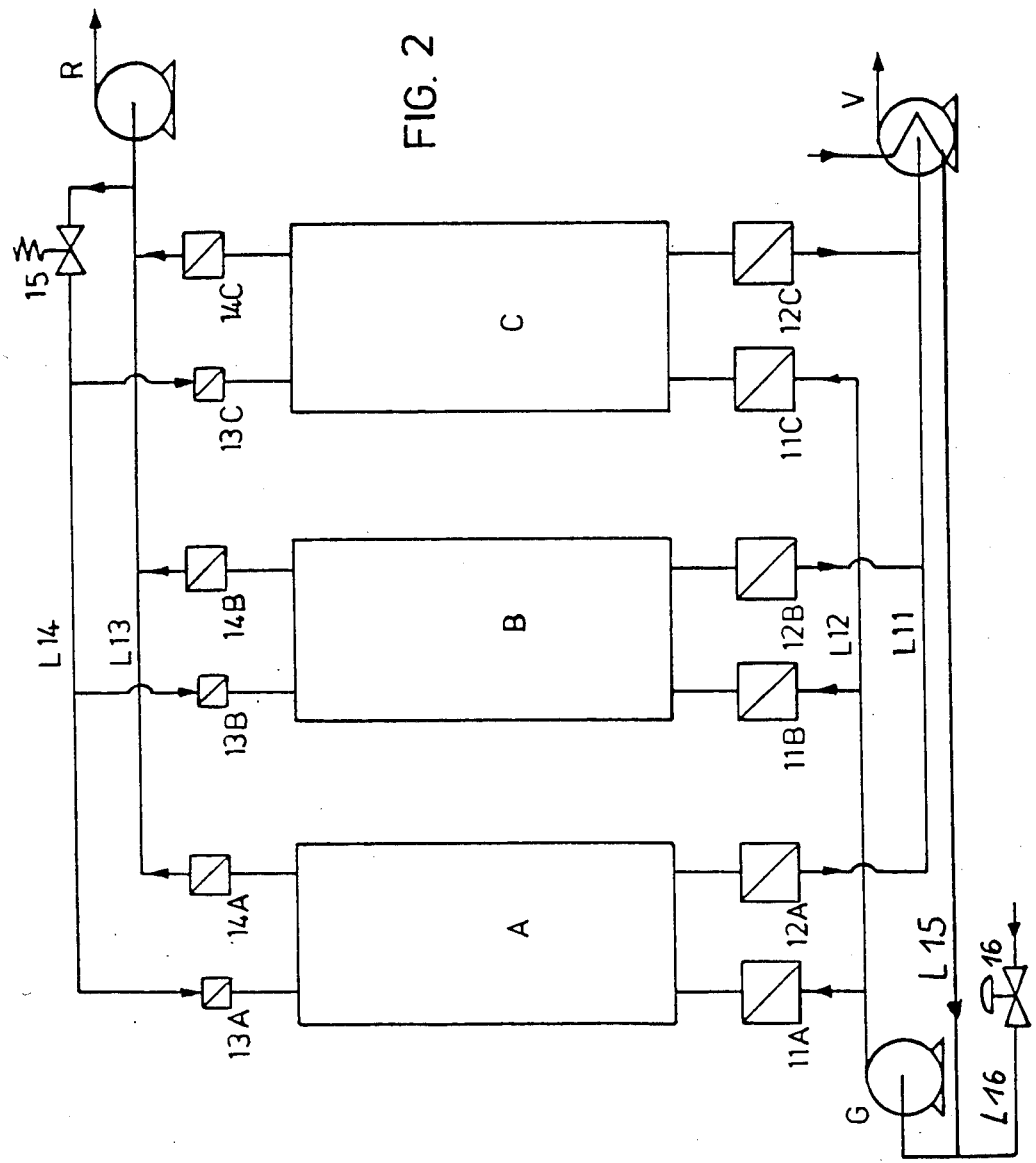
FIG. 2, shows a flow chart of the present process.

FIG. 2 shows a flow chart of part of the process according to the invention. In contrast to FIG. 1, a proportion of the ambient air or the total quantity of air is passed via the heat-exchanging surface of the vacuum pump (V) so that the heated portion of the air is mixed with ambient air (valve 16) and passes via the fan (G) for separation into the adsorbent bed. The mixing ratio of heated and unheated crude gas is based on the desired crude gas temperature in the adsorber, the heat exchange coefficient of the vacuum pump and the temperature of the non-pretreated crude gas.

The crude gas can always be heated by means of a vacuum pump as vacuum pumps are known to be relatively inefficient in terms of energy, i.e. a large proportion of the energy supplied, for example in a stream, is converted into heat. For this purpose, for example with Roots blower pumps, the pump is cooled with the working gas (gas pumped off) and/or also with water. Cooling of the gas, for example ambient air, is technically possible by enlarging the heat exchange surface. Combination of the cooling operations for example of a Roots blower pump employing working gas and separate ambient air can also be made.

In a further embodiment of the process according to the invention, several vacuum pumps are connected in series in accordance with FIG. 3, i.e. the desorbed gas passes pumps which are connected in series, the suction volume of the pumps diminishing in the direction of the atmospheric pressure. This arrangement has always proven advantageous if the type of vacuum pump has a significantly lower suction capacity in the region of the desired final pressure relative to a suction pressure of 1 bar abs, for example Roots blower pumps.

The size of the individual pumps should be adapted to the pressure swing process in order to achieve minimum energy consumption. In many cases, the graduation of the suction power in two, for example, Roots blower pumps in series, is approximately 2:1 and with three pumps arranged in tandem is 3:2:1. The precise graduation, however, is based on the desorption rate of the desorbed components and knowledge of the characteristic curve of the vacuum pump.

The following examples show in detail the progress of the process and processing conditions during this process, and the values obtained during tests with pilot installations and industrial installations demonstrate the considerable advantages of the process according to the invention.

Example 1 shows the influence of the temperature of the crude gas during the oxygen enrichment of air with molecular sieve zeolites.

EXAMPLE 1

A PSA installation according to FIG. 1 was used, and the total bed height of the adsorber was 2,500 mm, and 900 kg of silica gel were poured onto the base of each adsorber and 5,500 kg of molecular sieve zeolite 5A having a granule size of 2 to 5 mm were poured thereon. A rotating vacuum pump was used. Oxygen-enriched air could be removed from the adsorbers A, B and C using the compressor (R) and could be compressed to from 1.1 to 1.5 bar (abs).

Continuous processing with continuous removal of gas at the compressor (R) could be achieved by using the three adsorbers. The following timing was selected:

Stage 1: 0–70 seconds

Ambient air at 25° C. flows through fan (G), pipe L 12, valve 11 A at a constant pressure of about 1 bar (abs) into adsorber A, oxygen-enriched air is removed from fan R via valve 14 A, pipe L 13 as product. The valves 12A, 13A are closed. A proportion of the oxygen-enriched air simultaneously flows out through pipe L 13 via the valve 15 controlling the quantity of gas, pipe L 14, valve 13 B into adsorber B, while valves 14 B, 11 B and 12 B are closed. Adsorber B, which was subjected to desorption before this stage, i.e. was evacuated, is filled with oxygen-enriched air up to the adsorption pressure again. To avoid a reduced pressure in the adsorber A, for example due to excessively fast removal of product (filling gas) from pipe L 13, valve 15 is controlled in such a way that a constant flow of product (expressed in Nm$^3$/h) flows through pipe L 14, valve 13 B into adsorber B.

During the adsorption stage in adsorber A and during the filling stage in adsorber B, adsorber C is evacuated by means of the vacuum pump V via valve 12 C, pipe L 11, i.e. valves 11 C, 13 C, 14 C of the adsorber C are closed. After a desorption period or pumping off time of 70 seconds, an Hg manometer, which is located between valves 12 C and the adsorber C, indicates a final pressure of 70 mbar.

Stage 2: 70–140 seconds

Adsorber A is evacuated via valve 12 A, pipe L 11, vacuum pump (V) to a final pressure of 70 mbar, while valves 11 A, 13 A, 14 A are closed. Adsorber B is charged with air via fan (G), pipe L 12, valve 11 B, product gas is removed from compressor (R) from adsorber B via valve 14 B, pipe L 13. The valves 12 B, 13 B are closed. Adsorber C is charged at 70 mbar to an adsorption pressure of about 1 bar (abs), oxygen-enriched air passing from pipe L 13 via the gas-controlled valve 15, pipe L 14, valve 13 C into the adsorber C. Valves 11 C, 12 C, 14 C of adsorber C are closed.

Stage 3: 140–210

Adsorber A is brought from a minimum desorption pressure (70 mbar) to adsorption pressure 1 bar (abs) with oxygen-enriched air from pipe L 13 via valve 15, pipe L 14, valve 13 A, for which purpose valves 11 A, 12 A and 14 A are closed.

Adsorber B is evacuated from adsorption pressure to a final pressure of 70 mbar by means of a vacuum pump (V) via pipe L 11, valve 12 B, while valves 11 B, 14 B are closed.

Adsorber C delivers oxygen-enriched air, i.e. ambient air passes via fan (G), pipe L 12, valve 11 C into adsorber C, and product gas is removed from compressor (R) via valve 14 C, pipe L 13, while valves 12 C, 13 C are closed.

After a cycle of 210 seconds, the process is repeated, i.e. adsorption is taking place in adsorber A, adsorber B is filled and adsorber C evacuated.

A product stream having a constant oxygen concentration could be obtained within 0.5 to 1 hour after starting the test using compressor (R).

The quantity of oxygen-enriched air obtained was 240 $Nm^3/h$, the oxygen content 90.5% by volume, i.e. the $O_2$ quantity of product was 217 $Nm^3O_2/h$.

EXAMPLE 2

The course of processing and the processing conditions were identical to those in Example 1. A modification was made by the temperature of the quantity of air drawn in which was at $+7°$ to $+8°$ C. It was possible to determine that the final pressure rose slowly to 102 mbar and the oxygen concentration of the $O_2$-enriched air fell from 90.5% by volume at the outset to 81% by volume, when lowering the temperature of the processing air from $+25°$ C. to $+7°/+8°$ C. The quantity of $O_2$ in the product was thus only 194 $Nm^3/h$. The power requirement of the vacuum pump had dropped by about 3% relative to Example 1.

EXAMPLE 3

After carrying out the investigation according to Example 2, 40% of the $+7°/+8°$ C. cold ambient air according to FIG. 2 was heated using heat exchangers on the vacuum pump, mixed with the remaining air drawn in at a mixing temperature of 25° C. The final desorption pressure dropped again to 68 mbar. With a product of 240 $Nm^3/h$ of $O_2$-enriched air, the $O_2$ concentration in the product was 221 $Nm^3O_2/h$ at 92% by volume, i.e. the $O_2$ quantity in the product. The power requirement of the vacuum pump was identical to the value in Example 1. Optimum utilization of the pressure swing process could thus be achieved again at an undesirable crude gas temperature of $+7°/+8°$ C. without requiring additional energy.

In Examples 4, 5 and 6, the influence of the pump arrangement is demonstrated in a pressure swing process with vacuum regeneration, a process according to Example 1 and FIG. 1 being selected.

EXAMPLE 4

The course of processing was similar to Example 1 FIG. 1 except that the minimum desorption pressure was 150 mbar after 48 seconds. The adsorber had a volume of $2m^3$.

The quantity of product obtained was 67 $Nm^3/h$ with a $O_2$ concentration of 90% by volume. A Roots blower pump having a capacity of 2,200 $m^3/h$ (at 1 bar) was selected as vacuum pump.

During continuous operation, the power requirement of vacuum pump was 47 kW, i.e. the specific output was 0.80 $KWh/Nm^3O_2$.

EXAMPLE 5

The course of processing was similar to Example 1 with identical details except that a pump stand consisting of 2 series-connected Roots blower pumps according to FIG. 3 was selected as vacuum pump. The pump on the suction side of the adsorber maintains a nominal throughput of 1,950 $m^3/h$ at 1 bar abs and the second pump delivering after 1 bar maintains a nominal delivery output of 8,700 $m^3/h$ at 1 bar abs.

As in Example 4, a quantity of product of 67 $Nm^3/h$ with 90% by volume of oxygen was obtained and the power or current requirement of the pump set was 33 kW, i.e. the specific output was 0.55 $kWh/Nm^3O_2$.

EXAMPLE 6

The course of the process was similar to Examples 4 and 5 with identical details except that a pump stand consisting of 3 series-connected Roots blower pump was selected as vacuum pump. Pumps having nominal throughputs of 1,850 $m^3/h$ and 1,300 $m^3/h$ and 600 $m^3/h$ were used in series. The quantity of product gas was 67 $Nm^3/h$ with 90.5% by volume of oxygen, the power requirement of the pump stand being 28.5 kW, i.e. the specific output of the pressure swing installation was 0.47 $kWh/Nm^3O_2$.

With larger quantities of gas, i.e. larger installations, the efficiency of vacuum pumps is improved. Therefore, a specific output in the entire installation of 0.43 $kWh/Nm^3O_2$ could be achieved in a large installation for the production of 550 $Nm^3O_2$ enriched air/h with an $O_2$ content of 92.5% by volume from ambient air (24° C.) using a pump stand consisting of 3 Roots blower pumps connected in tandem. Precise balancing of the pumps is necessary for achieving this low energy consumption. By improving the efficiency of the individual pumps, it is possible to reduce the specific output of these installations somewhat, possibly to below 0.4 $kWh/Nm^3O_2$.

It will be understood that the specification and examples are illustrative but not limitative of the present invention and that other embodiments within the spirit and scope of the invention will suggest themselves to those skilled in the art.

I claim:

1. In a continuously operating adsorption process for the purification and separation of gaseous mixtures by pressure swing adsorption, comprising alternately permeating at least two adsorbent beds with the gaseous mixture to be separated at at least 1 bar (abs), removing the non-absorbed component at the adsorber outlet, desorbing the beds countercurrent to adsorption by means of a vacuum pump, and removing the desorbed phase and/or the non-adsorbed phase as product, the improvement which comprises heating the gaseous mixture to be separated by heat exchange with the vacuum pump, wherein the vacuum pump comprises at least two pumping units having different suction capacities and connected in series.

* * * * *